US006948783B2

United States Patent
Hoff (10) Patent No.: US 6,948,783 B2
(45) Date of Patent: Sep. 27, 2005

(54) TENSION ADJUSTMENT MECHANISM FOR A WORK MACHINE

(75) Inventor: Brian D. Hoff, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 276 days.

(21) Appl. No.: 10/067,204

(22) Filed: Feb. 7, 2002

(65) Prior Publication Data

US 2003/0122421 A1 Jul. 3, 2003

Related U.S. Application Data

(60) Provisional application No. 60/342,370, filed on Dec. 27, 2001.

(51) Int. Cl.[7] ............................................. B60B 55/30
(52) U.S. Cl. ...................................... 305/144; 305/145
(58) Field of Search ................................ 305/143, 144, 305/145, 153

(56) References Cited

U.S. PATENT DOCUMENTS

| | | | | |
|---|---|---|---|---|
| 3,310,127 | A | * 3/1967 | Siber et al. | 180/9.1 |
| 3,910,649 | A | * 10/1975 | Roskaft | 305/144 |
| 4,840,437 | A | 6/1989 | Henry et al. | |
| 5,031,973 | A | * 7/1991 | Gillet | 305/144 |
| 5,984,436 | A | 11/1999 | Hall | |
| 6,131,391 | A | 10/2000 | Poorman | |
| 6,249,994 | B1 | 6/2001 | Oertley | |
| 6,276,768 | B1 | * 8/2001 | Miller | 305/145 |
| 6,280,010 | B1 | 8/2001 | Oertley | |
| 6,305,763 | B1 | * 10/2001 | Oertley | 305/145 |
| 6,336,690 | B2 | * 1/2002 | Toms et al. | 305/145 |
| 6,354,678 | B1 | * 3/2002 | Oertley | 305/144 |

FOREIGN PATENT DOCUMENTS

DE            3246208       *  6/1984

* cited by examiner

Primary Examiner—Russell D. Stormer
(74) Attorney, Agent, or Firm—Finnegan, Henderson, Farabow, Garrett & Dunner (57) ABSTRACT

A method of operating a track-type machine having a drive wheel and an idler. The method includes operating the drive wheel to advance a drive track around the drive wheel and the idler thereby moving the track-type machine. The method further includes determining a force to be applied to the idler based on a direction of operation of the drive wheel and applying the force to the idler. The method may include varying the force applied to the idler as a function of a drawbar load of the machine. The method may include sensing a pressure of fluid being used to operate the drive wheel, wherein the force is determined based on the sensed pressure of fluid being used to operate the drive wheel. The method may include determining a force to be applied to the idler by selecting a recoil curve, sensing a position of the idler, and selecting the force to be applied based on a point on the selected recoil curve that corresponds to the sensed position of the idler on the selected recoil curve. The recoil curve may be selected from a plurality of recoil curves.

20 Claims, 5 Drawing Sheets

TENSION ADJUSTMENT MECHANISM FOR A WORK MACHINE

The present application claims priority to U.S. Provisional Application Ser. No. 60/342,370, filed Dec. 27, 2001, entitled TENSION ADJUSTMENT MECHANISM FOR A WORK MACHINE, with inventor of Brian D. Hoff, which is incorporated herein by reference.

TECHNICAL FIELD

This invention relates generally to a tension adjustment mechanism for a tracked work machine and, more particularly, to a method of providing a variable force to the idler of the machine based on the direction of operation.

BACKGROUND

A work machine, such as a track-type tractor or excavator, is typically supported and propelled by a pair of undercarriage assemblies. Each of the pair of undercarriage assemblies includes an endless track chain having a plurality of interconnected articulating components or links. Each undercarriage assembly typically also includes a drive wheel or sprocket and one or more idler wheels. The track chain is advanced around the drive sprocket and the one or more idler wheels.

During operation of the work machine, it is necessary to maintain tension on the track chain in order to keep the chain from derailing from the drive wheel or sprocket or the idler wheel. In order to maintain tension on the track chain, a tension adjustment mechanism such as a hydraulic cylinder or coiled spring is often included in the undercarriage assembly.

With regard to excavators, it is generally desirable to have the track chain relatively taut during performance of a digging or other type of work operation in order to prevent wear on the components associated with the undercarriage assembly and to provide a more stable work platform. A relatively taut track chain helps prevent the excavator from rolling back and forth within the interior of the track chain as a result of recoil forces generated during performance of the work operation. Hence, a relatively high tension level is desirably maintained on the track chains of excavators during a work operation, even though it is known that use of such a high tension level increases the rate at which components associated with the undercarriage assembly wear, especially during travel. To create tension on the track chain, the hydraulic cylinder or the coiled spring of the tension adjustment mechanism urges the idler wheel away from the drive wheel or sprocket, increasing the dimension of the undercarriage assembly which the track chain must encircle.

In contrast, it is generally desirable to have the track chain relatively loose during advancement or travel of an excavator. By loosening or otherwise decreasing tension on the track chain, wear on the components associated with the undercarriage assembly is reduced. This increases the efficiency and even the useful life of the excavator. To reduce tension in the track chain, the hydraulic cylinder or coiled spring of the tension adjustment mechanism moves the idler wheel toward the drive wheel or sprocket a certain incremental amount.

The tension adjustment mechanism also provides a recoil function in the track chain, accommodating temporary forces on the track such as when a rock or the like is ingested between the track and the wheels during advancement of the excavator. In these instances, the idler wheel is permitted to recoil toward the drive sprocket in order to accommodate the extra length the track must encircle in order to accommodate the rock without breaking.

When traveling in one direction, the rotation of the drive wheel or sprocket pulls on the top flight of the track chain, exerting a recoil force on the idler wheel. During travel in the opposite direction, the drive wheel or sprocket pulls on the bottom flight of the track chain which, because the bottom flight bears the weight of the machine against the ground, does not significantly transmit that force through the track chain to the idler wheel. Conventional track tension/recoil systems have a tensioning mechanism for varying track tension based on dig and travel requirements, and accordingly are not optimized for either.

U.S. Pat. No. 6,249,994 ("the '994 patent") discloses a tensioning mechanism which decreases track tension by a predetermined amount when the machine is traveling. The '994 patent discloses detecting an increase in drive pressure when the machine goes into its travel mode (because fluid is diverted from a work implement to the drive system) and then decreasing tension on the track chain in response to the detection of the increase in fluid drive pressure. Conversely, the '994 patent discloses detecting a decrease in drive pressure when the machine goes into its work mode (because fluid is diverted from the drive system to the work implement) and then increasing tension on the track chain in response to the detection of the increase in fluid drive pressure. The '994 patent does not disclose, however, differentiating between directions of travel and the drive force required to achieve travel.

In addition, conventional work machines do not effectively compensate for the advancement of the excavator under high drawbar loads, which is a common cause of "sprocket jumping," a condition where a bushing on the track chain slips over a tooth on the drive sprocket. Sprocket jumping has a detrimental effect on the wear of the components of the undercarriage assembly and on the hydraulic drive motor as it reflects large spikes in the pressure going into the drive motor. In addition, the recoil force created by the drive sprocket on the idler wheel during travel in one direction increases in proportion to the energy required to move the machine (referred to as drawbar load), sometimes moving the idler wheel too close to the drive sprocket under high drawbar loads.

The present invention is directed to solving one or more of the problems or disadvantages set forth above of current work machines.

SUMMARY OF THE INVENTION

The present invention provides a method of operating a track-type machine having a drive wheel and an idler. The method includes operating the drive wheel to advance a drive track around the drive wheel and the idler thereby moving the track-type machine. The method further includes determining a force to be applied to the idler based on a direction of operation of the drive wheel and applying the force to the idler. The method may include varying the force applied to the idler as a function of a drawbar load of the machine. The method may include sensing a pressure of fluid being used to operate the drive wheel, wherein the force is determined based on the sensed pressure of fluid being used to operate the drive wheel. The method may include determining a force to be applied to the idler by selecting a recoil curve, sensing a position of the idler, and selecting the force to be applied based on a point on the selected recoil curve that corresponds to the sensed position of the idler on the selected recoil curve. The recoil curve may be selected from a plurality of recoil curves.

The present invention also provides a work machine that includes a source of pressurized fluid, a fluid reservoir, a drive track, an idler, a drive wheel, an actuator, a valve assembly, and a controller. The drive wheel is operable to advance the drive track around the drive wheel and the idler. The actuator is mechanically coupled to the idler and is operable to increase and decrease a force being applied to the idler. The valve assembly is operable to control fluid flow from the source of pressurized fluid to the actuator and from the actuator to the fluid reservoir. The controller is configured to operate the valve assembly to apply a force to the idler based on a direction of operation of the drive wheel.

DETAILED DESCRIPTION

The invention as described below is applied to a hydraulic excavator. It should be appreciated that the present invention may be applied to any type of work machine having an endless track, such as a rubber belt or drive track chain, including, for example, track-type tractors, loaders, and military vehicles.

Figure 1:
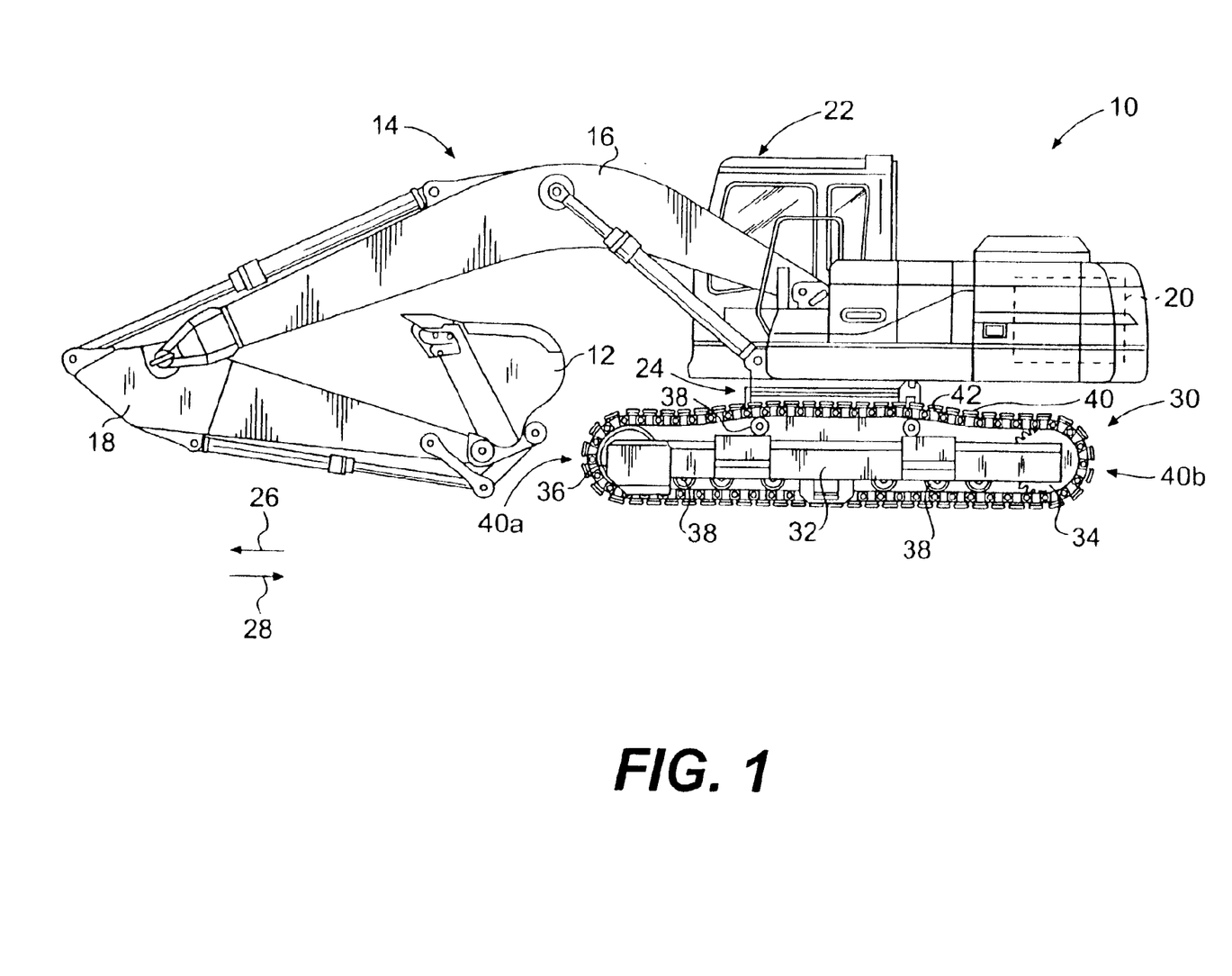
FIG. 1 is a side elevational view of an excavator which incorporates an exemplary embodiment of the present invention therein.

FIG. 1 illustrates a track-type work machine, for example, a hydraulic excavator 10, that is utilized to perform numerous work functions, such as digging and material movement. The excavator 10 may include a number of work implements, such as, for example, a hydraulically-powered bucket assembly 12, which is secured to an end of a boom assembly 14 having a boom arm 16 and a stick assembly 18. The excavator 10 further includes an engine such as, for example, a diesel engine 20, for providing the motive power for both advancing the excavator 10 and operating the bucket assembly 12 and the boom assembly 14.

Figure 2:
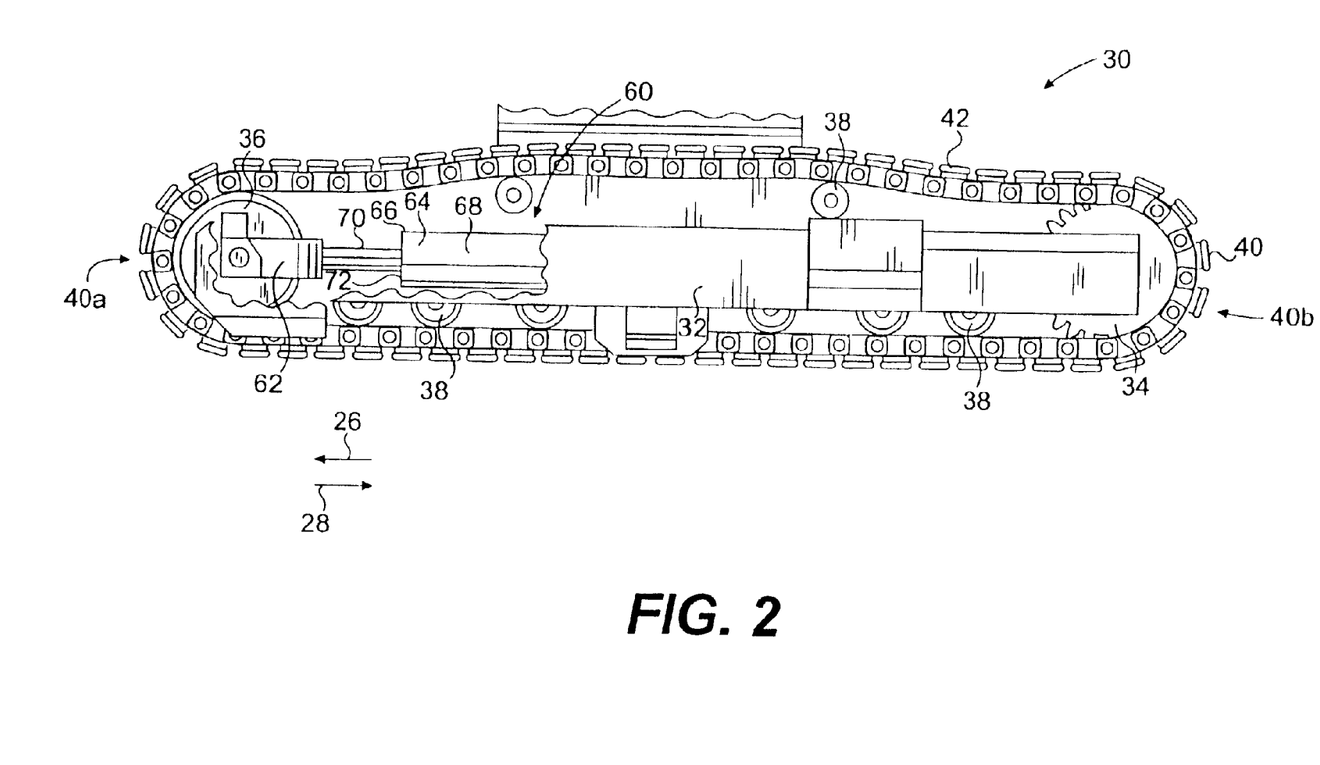
FIG. 2 is an enlarged, partially cutaway side elevational view of the undercarriage assembly of the excavator of FIG. 1.

The excavator 10 also includes a pair of undercarriage assemblies 30 (see FIG. 3), although only one undercarriage assembly 30 is shown in FIGS. 1 and 2. Each undercarriage assembly 30 generally includes a frame assembly 32, a drive mechanism 34, an idler wheel 36, and a number of midroller assemblies 38. For each undercarriage assembly 30, a drive track 40, such as, for example, an endless track chain, may be driven by the drive wheel 34 so as to be advanced around the idler wheel 36 and each of the midroller assemblies 38, thereby providing the motive power for advancing the excavator 10. It should be appreciated that drive mechanism 34 may comprise a drive wheel which is frictionally engaged with the drive track 40 or a drive sprocket which is mechanically engaged with the drive track chain 40. In one embodiment, the drive wheel 34 is positioned at a first end 40b of the assembly 30, while the idler wheel 36 is positioned at a second and opposite end 40a of the assembly 30.

As shown in FIG. 1, in an exemplary embodiment, the idler wheel 36 is positioned at the "front" end of the excavator 10 relative to a cab 22 (discussed below), while the drive wheel 34 is positioned at the "rear" end of the excavator 10 relative to the cab 22.

Figure 3:
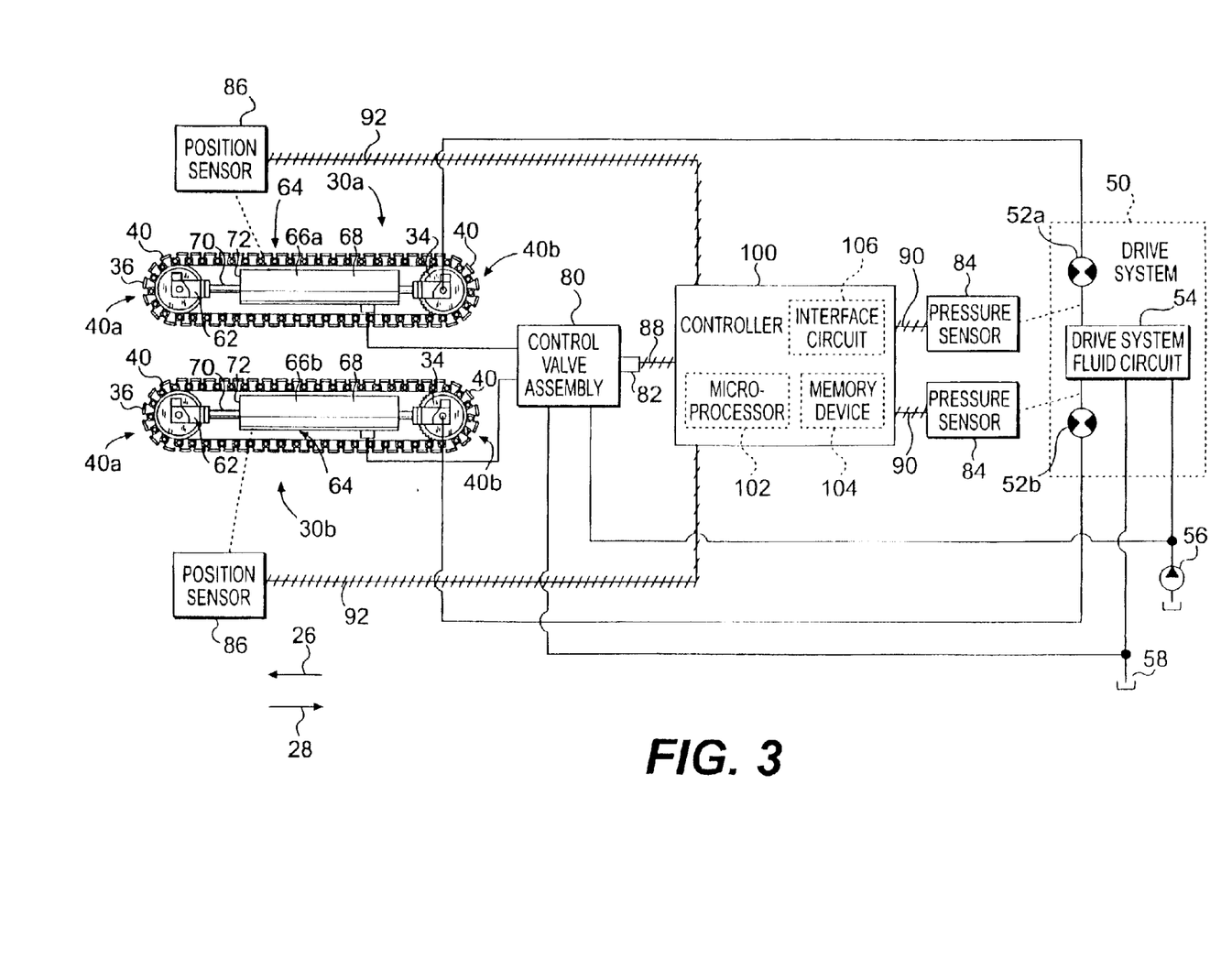
FIG. 3 is a schematic illustration of a track tensioning assembly according to an exemplary embodiment of the present invention.

FIG. 3 is a schematic illustration of a track tensioning assembly according to an exemplary embodiment of the present invention. To advance the excavator 10, mechanical output from the engine 20 (see FIG. 1) is transmitted to the drive wheels 34 via a hydraulic drive system 50 having one or more hydraulic drive motors 52. Each hydraulic drive motor 52 drives at least one of the drive wheels 34 to advance the drive track 40 and, hence, the excavator 10. As shown in FIG. 3, hydraulic drive motor 52a drives a drive wheel 34 associated with one undercarriage assembly 30a and hydraulic drive motor 52b drives a second drive wheel 34 associated with the other undercarriage assembly 30b. Through a drive system fluid circuit 54, each hydraulic motor 52a, 52b of the hydraulic drive system 50 is fluidly coupled with at least one source of pressurized fluid 56, such as, for example, a high-pressure pump (see FIG. 3). The drive system fluid circuit 54 supplies pressurized hydraulic fluid to the hydraulic motors 52a, 52b.

As shown in FIG. 1, the excavator 10 also includes the cab 22 that is provided to enclose or otherwise house the devices associated with the excavator 10, which are utilized by an operator during operation of the excavator 10. In particular, the cab 22 houses an operator seat (not shown) and a number of control devices such as a control lever assembly (not shown) and a foot pedal assembly (not shown). The cab 22 is positioned on the undercarriage assembly 30 of the excavator 10 on a swivel 24. The swivel 24 allows the cab 22 to be turned in both the clockwise and counterclockwise directions relative to the pair of undercarriage assemblies 30a, 30b (see FIG. 3).

In addition to the engine 20, other components of the excavator 10 may be positioned above the swivel 24. In one embodiment, the at least one fluid source 56 may be positioned above the swivel 24. In another embodiment, one or more return tanks or fluid reservoirs 58 (see FIG. 3) may be positioned above the swivel 24. As shown in FIG. 3, in an exemplary embodiment, a single fluid source 56 and a single reservoir 58 are fluidly coupled with both the drive system 50 that supplies hydraulic fluid to the motors 52a, 52b and a control valve assembly 80 (discussed below) that supplies hydraulic fluid to a recoil assembly 64 (discussed below) of each of the undercarriage assemblies 30a, 30b. One skilled in the art understands that the components positioned above the swivel 24 are connected with the components of the undercarriage assembly 30 through various conventional fluid and electrical lines (not shown) that travel through the swivel 24 or through wireless communications (such as a radio) (not shown). Typically, the hydraulic motors 52a, 52b of the hydraulic drive system 50 (not shown in FIG. 1) are positioned below the swivel 24.

As shown in more detail in FIG. 2, each undercarriage assembly 30 includes a track tensioning assembly 60. The track tensioning assembly 60 is configured to (1) provide a relative taut track configuration in order to minimize wear and prevent the excavator 10 from rolling back and forth during a work operation and (2) loosen the tension on the drive track 40 during advancement of the excavator 10 in order to decrease undercarriage component wear.

The track tensioning assembly 60 includes a recoil assembly 64 having a yoke 62 secured thereto. As shown in FIGS. 2 and 3, the idler wheel 36 is rotatably coupled to the yoke 62. Movement of the yoke 62 and hence the idler wheel 36 away from the drive wheel 34 (i.e., in the general direction of arrow 26 of FIGS. 1–3) increases tension of the drive track 40. Conversely, movement of the yoke 62 and hence the idler wheel 36 toward the drive wheel 34 (i.e., in the general direction of arrow 28 of FIGS. 1–3) decreases tension of the drive track 40.

The recoil assembly 64 includes an actuator that generally includes a cylinder that defines a chamber or housing, and a rod and/or a piston that are positioned within the housing. The components of the recoil assembly 64 are assembled together such that one component is fixed to the frame assembly 32 of the undercarriage assembly 30, while another component is moveable relative to the first component and is connected with the idler wheel 36 (through the yoke 62 as noted above) so as to urge that idler wheel 36 to increase and decrease tension on the drive track 40, respectively.

In one exemplary embodiment, as shown in FIGS. 2 and 3, each recoil assembly 64 may include an actuator, which are shown (in FIG. 3) as a right hydraulic cylinder 66a and a left hydraulic cylinder 66b for the pair of undercarriage assemblies 30a, 30b, respectively. The hydraulic cylinders 66a, 66b each have a fixed cylinder housing 68 having a moveable rod 70 extending therefrom. The rod 70 extends from a sealed opening 72 defined in the cylinder housing 68. In one exemplary embodiment, a first end of the rod 70 is secured to a piston (not shown) within the cylinder housing 68. A second end of each rod 70 is secured to the yoke 62 associated with the idler wheel 36. Extension of the rods 70 (i.e., movement of the rods 70 in the general direction of arrow 26) causes corresponding movement of the idler wheels 36, thereby increasing tension on the drive tracks 40. Conversely, retraction of the rods 70 (i.e., movement of the rods 70 in the general direction of arrow 28) causes corresponding movement of the idler wheels 36, thereby decreasing tension on the drive tracks 40.

In an alternative embodiment (not shown), the rod is fixed to the frame assembly of the excavator, and the cylinder housing is moveable relative to the fixed rod. In this exemplary embodiment, the cylinder housing is secured to the yoke such that extension of the cylinder housing causes corresponding movement of the idler wheel through the yoke. An advantage of this embodiment is that the seal between the rod and the cylinder housing is positioned within the cylinder housing, in a more protected environment. Generally, when the idler wheel kicks up debris from the round, the seal is not positioned where the debris is kicked up. In an alternative of this embodiment, the recoil assembly could be a single acting cylinder having a single port, and the port could be in the rod.

The disclosed system provides a method of operating a track-type machine, such as an excavator 10, by determining an appropriate force to be applied to the idler wheel 36 based on a direction of operation of the drive wheel 34 and then applying the appropriate force to the idler wheel 36 to achieve tension on the drive track 40. Determining the appropriate force to be applied to the idler wheel 36 may include determining a first force when the drive wheel 34 is operated in a first direction and determining a second force when the drive wheel 34 is operated in a second direction, where the second direction is opposite the first direction.

In one embodiment, the first direction is in the direction from the drive wheel 34 toward the idler wheel 36 and the second direction is in the direction from the idler wheel 36 toward the drive wheel 34. In the embodiment where the idler wheel 36 is positioned at the front end (shown as 40a in FIGS. 1–3) of the excavator 10 and the drive wheel 34 is positioned at the rear end (shown as 40b in FIGS. 1–3) of the excavator 10, the first direction is the forward direction 26 and the second direction is the rearward direction 28.

Figure 5:
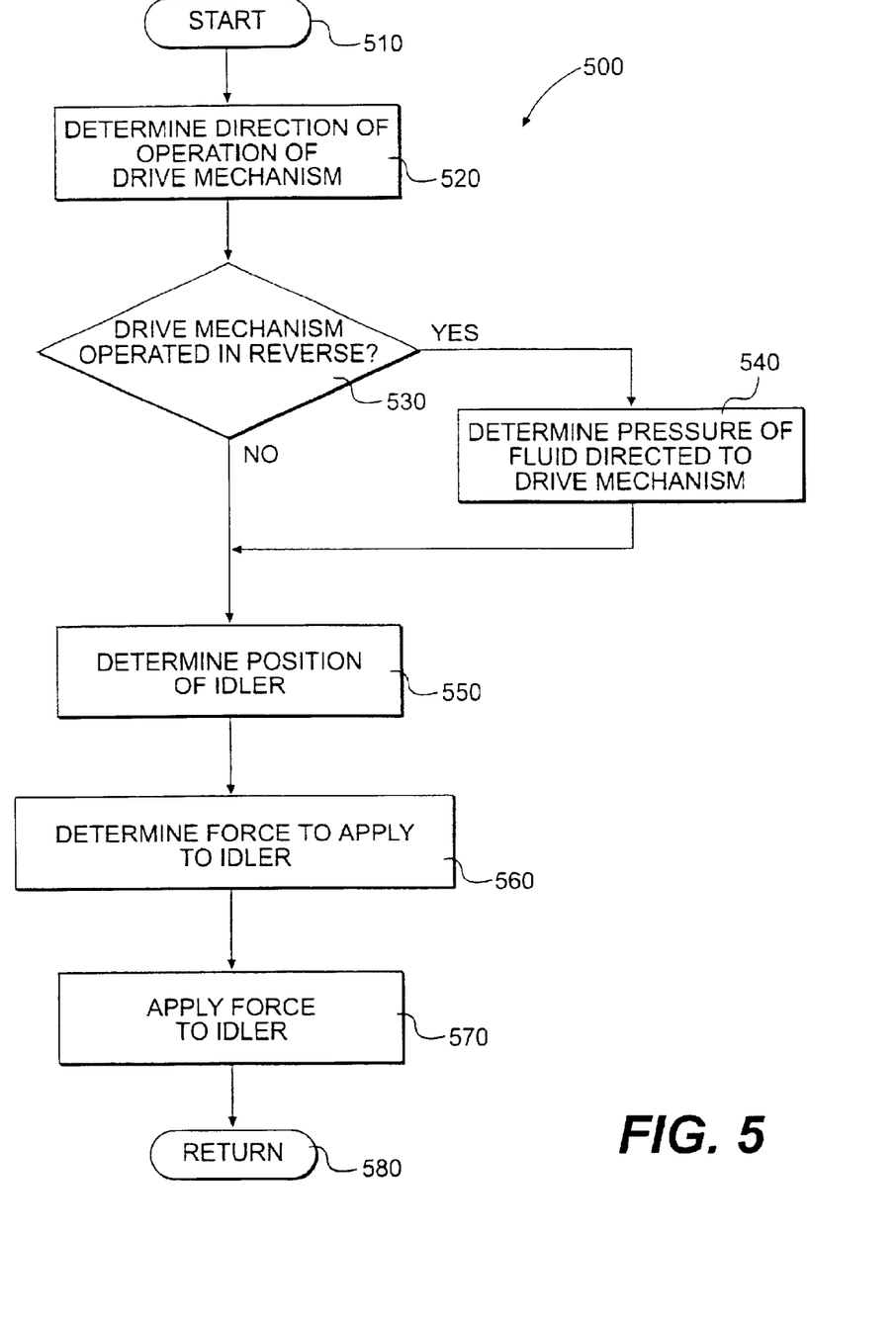
FIG. 5 is a block diagram illustrating a method of determining a force to be applied to an idler of a track-type work machine based on the direction of operation of the machine according to the present invention.

FIG. 5 illustrates a block diagram 500 of an exemplary operation of determining a force to be applied to an idler and applying the force to the idler to achieve a tension on the drive track. The exemplary operation commences with step 510. Then, in step 520, it is determined in which direction the drive mechanism is being operated. If, in step 530, the drive mechanism is being operated in the forward direction, control then proceeds to step 550 where the position of the idler wheel is determined. If, in step 530, the drive mechanism is being operated in the reverse direction, control then proceeds to step 540, where the fluid pressure to the drive mechanism is determined. Control then proceeds to step 550 where the position of the idler is determined.

After step 550, control proceeds to step 560 where the appropriate force to apply to the idler is determined. While traveling in the forward direction, the appropriate force to be applied to the idler is based on the determined position of the idler. While traveling in the reverse direction, the appropriate force to be applied to the idler is based on the determined pressure of fluid to the drive mechanism and the determined position of the idler. If the machine is not traveling, i.e., is stopped, then the force applied to the idler is generally a single force applied to the idler so as to maintain a tension on the drive track. This single force may be higher than the force applied to the idler wheel when the machine is traveling in the forward direction and when the machine is traveling in the reverse direction. This is because when the machine is stopped, the machine is often in a work mode, when the tension on the drive track should be higher than when the machine is traveling.

Control proceeds to step 570 where the appropriate force is applied to the idler wheel. Control then continues to step 580 where the control is returned to step 510.

Figure 4:
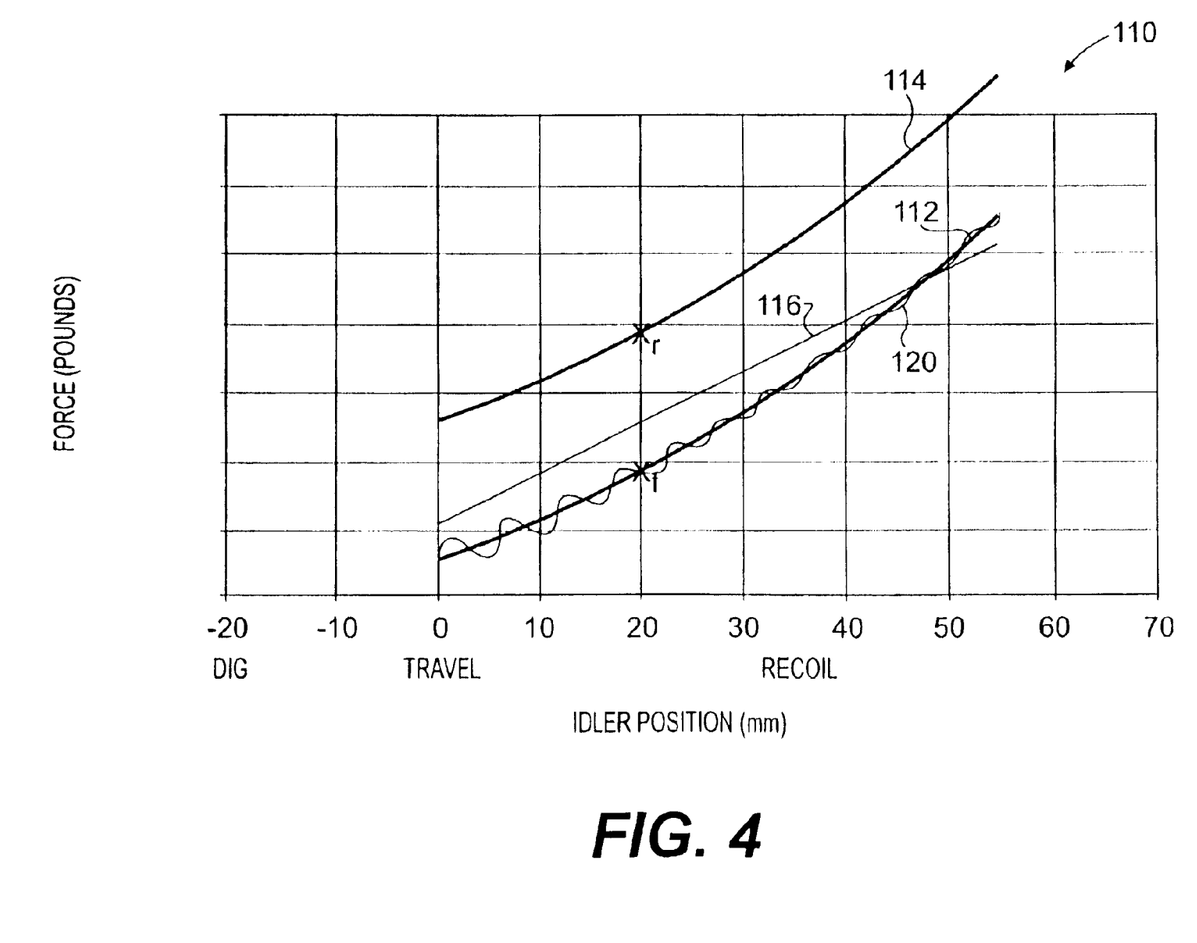
FIG. 4 is a graph illustrating the recoil response of an exemplary embodiment of the present invention.

In one embodiment, the method of determining the force to be applied to the an idler wheel 36 and then applying the force to the idler wheel 36 to achieve tension on the drive track 40 includes utilizing one or more recoil curves, such as curves 112 and 114 shown in the graph of FIG. 4. The x-axis of the graph is the displacement (in millimeters) of the idler wheel 36. The y-axis of the graph is the force (pounds) that will be exerted on the idler wheel 36 to control recoil. The graph illustrates two curves, 112 and 114, a line 116, and a wavy line 120. The curve 112 illustrates an appropriate recoil response when the excavator 10 is traveling in the forward direction 26. The wavy line 120 illustrates an actual recoil response. The actual recoil response 120 is near the curve 112 but does not necessarily fall directly on curve 112. The curve 114 illustrates one of a plurality of recoil responses when the excavator 10 is traveling in the rearward direction 28. The line 116 illustrates the recoil response for a prior art work machine that uses a coiled spring for a tension adjustment mechanism.

While the curve 112 and the curve 114 have the same general shape, the curve 114 is translated up on the y-axis because more force needs to be applied on the idler wheel 36 to counteract the force of the drive wheel 34 pulling on the idler wheel 36 during travel in the rearward direction 28. As discussed above, during travel in the rearward direction 28, the drive wheel 34 pulls the top flight 42 of the drive track 40 around the idler wheel 36. When the idler wheel 36 is positioned at the front end of the machine, this force pulls the idler wheel 36 toward the drive wheel 34, which aids the recoil function.

The curve 112, representing a desired recoil response curve when traveling in the forward direction 26, generally is a single curve for a single work machine. This is because, when traveling in the forward direction 26, the drive wheel 34 feeds the drive track 40 to the idler wheel 36 along the top flight 42. Thus, there is no pulling force on the idler wheel 36 by the drive wheel 34 to counteract.

In contrast, the curve 114, representing a desired recoil response curve when traveling in the rearward direction 28, may be one of a plurality of appropriate recoil response curves. The force exerted on the idler wheel 36 by the drive wheel 34 may vary depending on the drawbar load while the work machine is traveling in the rearward direction. Accordingly, there are a plurality of recoil response curves for a work machine traveling in the rearward direction that may be obtained through the present invention. Because a plurality of appropriate recoil response curves are provided for travel in the rearward direction, a work machine equipped with the present invention would operate equally well in the forward and rearward directions with high and low drawbar loads.

To graph the recoil response curves 112 and 114, data points may be plotted based on operating characteristics of the machine including the geometry of the undercarriage assembly, for example, the amount of space for a bushing to jump off the drive wheel and the wear on the track chain. The data points of the recoil response curves 112 and 114 may also be based on the drawbar load or environment conditions, such as the underfoot condition. The drawbar load is generally any force that the work machine has to overcome to move in a direction and includes, for example, the gross vehicle weight of the work machine, as well as the gross vehicle weight of any attachments attached to the work machine and any slope on which the work machine is traveling. The underfoot condition refers to the surface on which the work machine is traveling and includes pavement, soft dirt, mud, clay, and the like. Once the data points of the recoil response curves 112 and 114 are plotted on a graph, an equation may be determined that best fits those data points. This equation may be inserted as part of the algorithm that is part of the code (that is stored in a memory device 104 discussed below) that is utilized to vary the force applied to the idler wheel 36 based on the recoil response curves 112 and 114.

When the excavator 10 is traveling in the rearward direction 28, the fluid pressure to the drive motor 52a is proportional to a force pulling on the idler wheel 36 by the drive wheel 34 of the right undercarriage assembly 30a and, similarly, the fluid pressure to the drive motor 52b is proportional to a force pulling on the idler wheel 36 by the drive wheel 34 of the left undercarriage assembly 30b. For each of the undercarriage assemblies 30a, 30b, once the fluid pressure to its drive motor 52 (also referred to as "the drive pressure") is known, the fluid pressure to its hydraulic cylinder 66 may be increased to counteract the force that its drive wheel 34 exerts on its idler wheel 36 during travel in the rearward direction that tends to cause recoil. For each of the undercarriage assemblies 30a, 30b, the increase of fluid pressure to its hydraulic cylinder 66 creates another force that is applied to its idler wheel 36 in the direction 26, i.e., away from its rear drive wheel 34, to counteract the effect of the force of the drive wheel 34 pulling on the idler wheel 36.

The recoil response of the present invention is such that the external force required to cause recoil of the idler wheel 36 is the same, whether the machine is traveling forward or reverse, with high or low drawbar loads. The force applied to counteract recoil varies according to whether the machine is traveling in the forward direction 26 or the rearward direction 28.

It should also be appreciated that the amount of the drawbar load is proportional to the drive pressure because the fluid pressure to the drive motors 52a, 52b would be increased if the drawbar load increased, in order to ensure that the machine may overcome the weight of the machine and/or any attachments and be able move in a given direction. In addition, as noted above, when the machine is traveling in the rearward direction 28, the fluid pressure to the drive motors 52 is proportional to the force pulling on the idler wheel 36. Accordingly, the drive pressure is proportional to both the amount of the drawbar load and the amount of the force pulling on the idler wheel 36 to affect recoil when the machine is traveling in the rearward direction 28.

As shown in FIG. 3, in one exemplary embodiment, a controller 100 communicates with an electrically-actuated control valve assembly 80, one or more pressure sensors 84, and one or more position sensors 86 in order to maintain tension on each drive track 40 of each undercarriage assembly 30a, 30b. For example, the controller 100 may be utilized to provide an appropriate recoil response (such as curve 112 (for forward direction 26) and curve 114 (for rearward direction 28) shown in FIG. 4) for the excavator 10. Generally, the controller 100 may receive signals from the position sensors 86 representing the positions of the hydraulic cylinders 66a, 66b and signals from the pressure sensors 84 representing the fluid pressure to each of the hydraulic motors 52a, 52b of the hydraulic drive system 50. Utilizing these signals, as well as an algorithm that includes at least one recoil response curve, the controller 100 may determine whether fluid needs to be supplied to or drained from the hydraulic cylinders 66a, 66b. Upon a signal from the controller 100, the control valve assembly 80 may be utilized to either supply fluid to or drain fluid from the hydraulic cylinders 66a, 66b in order to obtain a level of tension based on the appropriate recoil response.

The control valve assembly 80 controls actuation of the hydraulic cylinders 66a, 66b in order to increase or decrease tension on its corresponding drive track 40. The control valve assembly 80 is electrically coupled to the controller 100. In one exemplary embodiment, a solenoid 82 of the control valve assembly 80 is electrically coupled to the controller 100 via a signal line 88. To increase fluid pressure in the hydraulic cylinders 66a, 66b, fluid is supplied to the hydraulic cylinders 66a, 66b from the fluid source 56 through the control valve assembly 80. To decrease fluid pressure in the hydraulic cylinders 66a, 66b, fluid is drained from the hydraulic cylinders 66a, 66b to the fluid reservoir 58 through the control valve assembly 80.

In one exemplary embodiment, the control valve assembly 80 includes an independent metering valve (IMV) assembly. The IMV assembly may be operated to fluidly couple the hydraulic cylinders 66a, 66b so as to increase or decrease fluid pressure in the hydraulic cylinders 66a, 66b to increase or decrease, respectively, tension on the drive track 40. The IMV assembly may be an electrically-actuated valve assembly that includes a pressure sensor 84 therein.

The one or more pressure sensors 84 are utilized to sense pressure in one or more fluid lines. In an exemplary embodiment, one pressure sensor 84 senses the fluid pressure to the hydraulic motor 52a (that drives the drive wheel 34 for the undercarriage assembly 30a), while a second pressure sensor 84 senses the fluid pressure to the hydraulic motor 52b (that drives the drive wheel 34 for the undercarriage assembly 30b). Each pressure sensor 84 may be electrically coupled to the controller 100 via a signal line 90. Thus, in the embodiment including two pressure sensors 84, output signals generated by the pressure sensors 84 are communicated to the controller 100 via a pair of signal lines 90.

The one or more position sensors 86 may be located such that they can monitor the position of a number of undercarriage components relative to one another. At least one of the position sensors 86 is provided to sense the position of one rod 70 relative to its corresponding housing 68 of one of the hydraulic cylinders 66a, 66b. In one exemplary embodiment, two position sensors 86 are provided, each to sense the position of each rod 70 relative to its corresponding housing 68 of each of the hydraulic cylinders 66a, 66b. The position sensors 86 may be provided as any type of sensor which is capable of sensing the position of the rods 70. It should be appreciated that the position of the idler wheels 36 may be ascertained from the position of the rod 70 relative to its corresponding housing 68. In another exemplary embodiment, at least one of the position sensors 86 may be provided to sense the position of at least one of the idler wheels 36. For example, the position sensors may be magnetostrictive position sensors that are part of the hydraulic cylinders 66a, 66b or linear displacement transducers.

Each position sensor 86 may be electrically coupled to the controller 100 via a signal line 92 or, in the alternative, via wireless communication (not shown). Thus, in the embodiment including two position sensors 86 for sensing each of idler wheels 36 of both undercarriage assemblies 30a, 30b, output signals generated by the position sensors 86 are communicated to the controller 100 via a pair of signal lines 92. Such output signals may be generated and thereafter communicated by the position sensors 86 in numerous forms. For example, the position sensors 86 may generate output signals in the form of an analog DC voltage, or in the form of a signal utilizing current-to-pulse signal timing or pulse width modulation.

The controller 100 includes electrical components commonly found in other work machine controllers, such as a microprocessor 102, a memory device 104, and an interface circuit 106. The controller 100 may be a dedicated controller for controlling the components shown in FIG. 3. In the alternative, the controller 100 may be integrated into another controller associated with the excavator 10, such as an engine controller (not shown), transmission controller (not shown), or an implement controller (not shown).

The interface circuit 106 converts the output signals from the one or more pressure sensors 84 and the one or more position sensors 86 into signals that are suitable for presentation to an input of the microprocessor 102. It should be appreciated that the magnitude of the voltage generated by each pressure sensor 84 is indicative of the hydraulic fluid pressure to one of the hydraulic motors 52a, 52b, while the magnitude of the voltage generated by each position sensor 86 is indicative of the position of one of the rods 70 within its corresponding cylinder housing 68 or, more generally, the position of one of the idler wheels 36.

The interface circuit 106 also converts output signals generated by the microprocessor 102 into signals which are suitable for use by the solenoid 82 associated with the control valve assembly 80. In particular, the interface circuit 106 may convert the output signals from the microprocessor 102 into an analog actuation pulse which actuates the solenoid 82, thereby positioning the control valve assembly 80 into one of its actuated positions in order to cause extension or retraction of the hydraulic cylinders 66a, 66b, as described above. It should be appreciated that the interface circuit 106 may be embodied as a discrete device or a number of devices, or may be integrated into the microprocessor 102.

The memory device 104 is provided to store the code or set of instructions that are executed by the controller 100 during operation of the track tensioning assembly 60. For example, the memory device 104 is utilized to store the code containing an algorithm that includes a plurality of appropriate recoil curves, such as a recoil curve 112 (see FIG. 4) for travel in the forward direction 26 and a plurality of recoil curves 114 (see FIG. 4) for travel in the rearward direction 28, for a variety of parameters. Moreover, operation parameters may also be stored in the memory device 104. The memory device may be embodied as any known memory device, such as RAM and/or ROM devices.

As discussed above, in an exemplary embodiment, the controller 100, along with the control valve assembly 80, the pressure sensor(s) 84, and the position sensor(s) 86, are utilized to ensure that the recoil response of a work machine is at or near a level of tension based on the desired recoil curves 112 and 114 for that machine. Again, the actual recoil response may not fall directly on curve 112 or 114, but may fall generally around these curves, such as shown in the wavy line 120 that follows the general shape of curve 112.

As noted above, there are a plurality of recoil response curves 114 for a single work machine. In one embodiment, the controller 100 first determines which of the available recoil response curves is the appropriate recoil response curve. For example, the controller 100 may select the appropriate recoil response curve 114 based on the reverse drive pressure (the drive pressure to the hydraulic motors 52a, 52b when the excavator is traveling in the rearward direction 28) sensed by the pressure sensor 84, because the reverse drive pressure is proportional to the force pulling on the idler wheel 36. Thus, the appropriate recoil response curve 114 selected is based on compensating or counteracting for that force pulling on the idler wheel 36. As discussed above, the appropriate recoil response curve 114 selected is indirectly reflective of the drawbar load and the underfoot condition because each of the available recoil response curves include data points that are reflective of the drawbar load and the underfoot condition.

In an exemplary embodiment, when the reverse drive pressure to the drive motors 52a, 52b is continuously sensed by pressure sensors 84, the controller 100 continuously selects an appropriate recoil response curve 114 for each of the undercarriage assemblies 30a, 30b, respectively. A later selected appropriate recoil response curves 114 may be similar to an earlier curve if conditions are relatively constant or may be quite different if conditions change, such as, for example, traveling on a different surface (a different underfoot condition).

Optionally, applying the appropriate force to the idler wheel 36 based upon a recoil curve 112 or 114 includes sensing a position of the idler wheel 36 to determine the amount of recoil of the idler wheel 36, plotting the sensed position of the idler wheel 36 on the recoil curve 112 or 114, and varying the force to the idler wheel 36 based on the recoil curve 112 or recoil curve 114.

More particularly, the position sensor 86 senses the position of rod 70 within its corresponding housing 68 of at least one of the hydraulic cylinders 66a, 66b. In an exemplary embodiment, two position sensors 86 each sense the position of a rod 70 within its corresponding housing 68 of both hydraulic cylinders 66a, 66b. It should be appreciated that the position of the idler wheel 36 is dependent on the position of the rod 70. Thus, once the position of the rod 70 relative to its corresponding housing 68 is determined, then the position of the idler wheel 36 may be determined or, in other words, the amount of recoil of the idler wheel 36. In the exemplary embodiment, because both hydraulic cylinders 66a, 66b are being sensed, the amount of recoil of both idler wheels 36 may be determined.

Once the amount of recoil of the idler wheel 36 is inputted into the controller 100, the controller 100 compares the position of the idler wheel 36 to the recoil curve 112 (when the excavator 10 is traveling in the forward direction 26) or the appropriate recoil curve 114 that the controller 100 has selected for that situation (when the excavator 10 is traveling in the rearward direction 28). In the exemplary embodiment, because the amount of recoil of both idler wheels 36 are determined, the positions of both of the idler wheels 36 are compared to the recoil curve 112 or 114 for that undercarriage assembly 30a, 30b.

For each undercarriage assembly 30a, 30b, the amount of idler wheel 36 recoil is a position value (on the x-axis) on a graph, such as shown in FIG. 4. Knowing that idler wheel 36 position, it is determined how much to vary the force applied to the idler wheel 36 by determining what the appropriate force on the idler wheel 36 should be based on the recoil curve 112 (when traveling in the forward direction 26) or the appropriate recoil curve 114 (when traveling in the rearward direction 28). For example, if the idler wheel 36 recoil is around 20 mm, then the amount of force that should be applied to the idler wheel 36 is shown as $X_f$ in FIG. 4 during travel in the forward direction 26 and is shown as $X_r$ during travel in the rearward direction 28. In the exemplary embodiment, the amount of force to be applied to the idler wheel 36 is determined for both idler wheels 36 of both undercarriage assemblies 30a, 30b based on the recoil curve 112 or the appropriate recoil curve 114 that the controller has selected for each of the undercarriage assemblies 30a, 30b.

After it is determined how much force should be applied to the idler wheel 36 based on the recoil response curve 112 or the appropriate recoil response curve 114, the controller 100 signals the control valve assembly 80 to either supply fluid to or drain fluid from one or both recoil assemblies 64 in order to move one or both rods 70 relative to its or their corresponding housings 68 in order to exert more force or less force, respectively, on the idler wheels 36 of one or both of the undercarriage assemblies 30a, 30b. During travel in the rearward direction 28, this additional force on the idler wheel 36 is a force that counteracts the effect of the force exerted on the idler wheel 36 by the drive wheel 34 during travel in the rearward direction 28. Accordingly, in the manner described above, the controller 100 controls operation of the control valve assembly 80 so as to increase fluid pressure in the hydraulic cylinder 66a and/or hydraulic cylinder 66b to exert more force on one or both of the idler wheels 36. This force is exerted on the idler wheels 36 in the forward direction 26 to counteract the force that the rear drive wheel 34 exerts on the idler wheels 36 during travel in the rearward direction 28.

INDUSTRIAL APPLICABILITY

The present invention allows for determining the appropriate force to be applied to the idler wheel 36 based on the direction of operation of a track-type work machine and applying the appropriate force to the idler wheel 36 to achieve a predetermined tension on the drive track 40. When the track-type work machine is traveling in the direction from the drive wheel 34 to the idler wheel 36, the appropriate force to the idler wheel 36 may be applied in a variable manner based on a recoil curve, such as curve 112. When the track-type work machine is traveling in the direction from the idler wheel 36 to the drive wheel 34, the appropriate force to the idler wheel 36 may be applied in a variable manner by, first, determining the pressure to the drive wheel to select an appropriate recoil curve, such as curve 114, then determining the idler position, and then using the determined idler position value to determined the appropriate force based on the selected recoil curve.

With respect to the excavator 10 of the exemplary embodiment, the controller 100 communicates with the control valve assembly 80, the pressure sensors 84, and the position sensors 86 in order to ensure that the recoil response of the excavator 10 complies with the appropriate recoil curves for that excavator 10 in a particular situation. The pressure sensors 84 sense the fluid pressure to both hydraulic motors 52a, 52b of the hydraulic system 50, and the values of the sensed fluid pressures are inputted to the controller 100. Similarly, the position sensors 86 sense the position of the rod 70 relative to its corresponding housing 68 for both of the undercarriage assemblies 30, and these position values are also inputted to the controller 100. The controller 100 utilizes these values in an algorithm contained within the memory device 104 of the controller 100. The algorithm within the memory device 104 includes therein various operating parameters, including a plurality of recoil response curves for when the excavator 10 is traveling in the rearward direction 28 that are dependent, at least in part, on the drawbar load and environmental conditions. Again, there is generally only one desired recoil response curve for an excavator 10 that is traveling in the frontward direction 26.

Accordingly, during travel in the forward direction 26, the algorithm includes a recoil response curve 112. During travel in the rearward direction 28, from the plurality of recoil response curves available in the algorithm, the controller 100 provides an appropriate recoil response curve 114 (with respect to each idler wheel 36 for each of the undercarriage assemblies 30a, 30b) based on the drive pressure that the pressure sensor 84 senses is going to both hydraulic drive motors 52a, 52b. This drive pressure is proportional to the force pulling on the idler wheel 36 when the excavator is traveling in the rearward direction 28. Thus, the controller 100 provides the appropriate recoil response curve 114 for each idler wheel 36 to compensate for that force pulling on the idler wheel 36 for each of the undercarriage assemblies 30a, 30b.

For both undercarriage assemblies 30a, 30b, the controller determines how much the idler wheel 36 is recoiled using the position sensors 86 that sense the position of the rods 70 relative to their corresponding housings 68 of both hydraulic cylinders 66a, 66b. Knowing how much the idler wheel 36 is recoiled of each undercarriage assembly 30a, 30b, the controller 100 compares that sensed position value of the idler wheel 36 with the recoil response curve 112 (when traveling in the forward direction 26) or 114 (when traveling in the rearward direction 28) for each undercarriage assembly 30a, 30b. As stated above, as an example, using the recoil response curves 112 and 114 shown in the graph of FIG. 4, if the idler wheel 36 recoil is around 20 mm, then the amount of force that is appropriate to be exerted on the idler wheel 36 is shown as $X_f$ in FIG. 4 when traveling in the forward direction 26 and is shown as $X_r$ in FIG. 4 when traveling in the rearward direction 28.

To achieve that appropriate force on the idler wheel 36, the controller 100 outputs signals to the control valve assembly 80. Upon receiving the output signal from the controller 100, the control valve assembly 80 supplies fluid to or drains fluid from one or both hydraulic cylinders 66a, 66b to achieve that appropriate force.

In contrast to the currently available work machines, the present invention allows for a recoil response for both forward and rearward directions. By monitoring the system conditions, such as drive pressure, the present invention takes into account factors such as drawbar load and underfoot conditions in selecting the appropriate recoil response curve. This allows for appropriate tensioning of the track chain during work operation and travel, thereby resulting in extending the useful life of the machine. While the disclosed embodiment refers to an excavator, it should be understood that the present invention has wider application to various types of tracked vehicles.

Other aspects and features of the present invention can be obtained from a study of the drawings, the disclosure, and the appended claims.

What is claimed is:

1. A method of operating a track-type machine having a drive wheel and an idler, the method comprising:
    operating the drive wheel to advance a drive track around the drive wheel and the idler thereby moving the track-type machine;
    determining a direction of operation of the drive wheel;
    sensing a pressure of fluid being used to operate the drive wheel;
    determining a force to be applied to the idler based on the determined direction of operation of the drive wheel and, depending on the determined direction of operation, the sensed pressure of fluid being used to operate the drive wheel;
    applying the force to the idler.

2. The method of claim 1, wherein said determining a force includes selecting a recoil curve from a plurality of recoil curves based on the sensed pressure of fluid being used to operate the drive wheel and selecting the force to be applied based on a point on the selected recoil curve that corresponds to the sensed position of the idler on the selected recoil curve.

3. The method of claim 2, wherein the direction of operation is in a direction from the idler toward the drive wheel.

4. The method of claim 1, wherein said applying the force includes operating a valve assembly to control fluid pressure within an actuator associated with the idler.

5. The method of claim 1, wherein said determining a force includes determining a first force when the drive wheel is operated in a direction from the drive wheel toward the idler and determining a second force differing from the first force when the drive wheel is operated in a direction from the idler toward the drive wheel.

6. The method of claim 1, wherein the force applied to the idler is a function of a drawbar load of the machine.

7. A work machine, comprising:
    a source of pressurized fluid;
    a fluid reservoir;
    a drive track;
    an idler;
    a drive wheel, the drive wheel being operable to advance the drive track around the drive wheel and the idler;
    an actuator mechanically coupled to the idler, the actuator being operable to increase and decrease a force being applied to the idler;
    a valve assembly operable to control fluid flow from the source of pressurized fluid to the actuator and from the actuator to the fluid reservoir;
    a pressure sensor configured to sense the pressure of fluid being directed from the source of pressurized fluid to the drive wheel; and
    a controller configured to operate the valve assembly to apply a force to the idler based on a direction of operation of the drive wheel and, depending on the determined direction of operation, the sensed pressure of fluid being directed to the drive wheel.

8. A The work machine of claim 7, further including a position sensor configured to sense a position of the idler, and
    wherein the controller is configured to operate the valve assembly to apply the force to the idler by selecting a recoil curve from a plurality of recoil curves based on the sensed pressure of fluid being directed to the drive wheel and by selecting the force to be applied to the idler based on a point on the selected recoil curve that corresponds to the sensed position of the idler on the selected recoil curve.

9. The work machine of claim 1, wherein the drive wheel is operable to advance the drive track in a first direction that is associated with movement of the work machine in a direction from the drive wheel toward the idler and in a second opposing direction that is associated with movement of the work machine in a direction from the idler toward the drive wheel, and
    wherein the controller is configured to operate the valve assembly to apply a first force when the drive wheel is operated in the first direction and a second force when the drive wheel is operated in the second direction, the first force differing from the second force.

10. The work machine of claim 7, wherein the force applied to the idler is a function of a drawbar load of the machine.

11. A method of operating a track-type machine having a drive wheel at a first end of the track-type machine and an idler at a second end of the track-type machine, the method comprising:
    operating a drive wheel to advance a drive track around the drive wheel and the idler thereby moving the track-type machine, the drive wheel being operable in a first direction associated with movement of the track-type machine in a direction from the drive wheel toward the idler and in a second direction associated with movement of the track-type machine in a direction from the idler toward the drive wheel;
    determining a force to be applied to the idler based on a direction of operation of the drive wheel and a sensed position of the idler when the drive wheel is operated in the first direction, and, when the drive wheel is operated in the second direction, based on a direction of operation of the drive wheel, a sensed pressure of fluid being used to operate the drive wheel, and a sensed position of the idler; and
    applying the force to the idler.

12. A method of operating a track-type machine having a drive wheel and an idler, the method comprising:
    operating the drive wheel to advance a drive track around the drive wheel and the idler thereby moving the track-type machine;

determining a direction of operation of the drive wheel;

determining an amount of recoil of the idler;

determining, when the drive wheel is operated in a first direction, a force to be applied to the idler based on the determined direction of operation of the drive wheel and the amount of recoil of the idler; and applying the force to the idler.

13. The method of claim 12, further including, when the drive wheel is operated in a second direction opposite the first direction, sensing a pressure of fluid being used to operate the drive wheel, wherein said force to be applied is determined based on the determined direction of operation of the drive wheel, a sensed pressure of fluid being used to operate the drive wheel, and the amount of recoil of the idler.

14. The method of claim 12, wherein said determining the amount of recoil includes sensing a position of the idler.

15. The method of claim 12, wherein the force applied to the idler is a function of a drawbar load of the machine.

16. The method of claim 12, wherein said applying the force includes operating a valve assembly to control fluid pressure within an actuator associated with the idler.

17. A work machine, comprising:

a source of pressurized fluid;

a fluid reservoir;

a drive track;

an idler;

a drive wheel, the drive wheel being operable to advance the drive track around the drive wheel and the idler;

an actuator mechanically coupled to the idler, the actuator being operable to increase and decrease a force being applied to the idler;

a valve assembly operable to control fluid flow from the source of pressurized fluid to the actuator and from the actuator to the fluid reservoir; and a controller configured to determine a direction of operation of the drive wheel and an amount of recoil of the idler, and to operate the valve assembly, when the drive wheel is operated in a first direction, to apply a force to the idler based on the determined direction of operation of the drive wheel and the amount of recoil of the idler.

18. The work machine of claim 17 further including a pressure sensor configured to sense the pressure of fluid being directed from the source of pressurized fluid to the drive wheel, wherein, when the drive wheel is operated in a second direction opposite the first direction, said force to be applied is determined based on the determined direction of operation of the drive wheel, a sensed pressure of fluid being used to operate the drive wheel, and the amount of recoil of the idler.

19. The work machine of claim 17, further including a position sensor configured to sense a position of the idler, wherein the controller determines the amount of recoil of the idler based on a sensed position of the idler.

20. The work machine of claim 17, wherein the force applied to the idler is a function of a drawbar load of the machine.

* * * * *

UNITED STATES PATENT AND TRADEMARK OFFICE
CERTIFICATE OF CORRECTION

PATENT NO. : 6,948,783 B2
DATED : September 27, 2005
INVENTOR(S) : Brian D. Hoff It is certified that error appears in the above-identified patent and that said Letters Patent is hereby corrected as shown below:

Column 13,
Line 37, after "operate the drive wheel;", insert -- and --.

Column 14,
Line 26, delete "claim 1," and insert -- claim 7, --.

Column 15,
Line 6, after "and" (second occurrence), the phrase "applying the force to the idler." should begin a new paragraph.

Signed and Sealed this

Seventeenth Day of January, 2006

JON W. DUDAS
*Director of the United States Patent and Trademark Office*